United States Patent [19]

Kafka et al.

[11] Patent Number: 4,913,533
[45] Date of Patent: Apr. 3, 1990

[54] KTP CRYSTAL NONLINEAR OPTICAL DEVICE WITH REDUCED DRIFT AND DAMAGE

[75] Inventors: James D. Kafka; Thomas M. Baer, both of Mountain View; Richard L. Herbst, Palo Alto, all of Calif.

[73] Assignee: Spectra-Physics, Inc., Calif.

[21] Appl. No.: 136,896

[22] Filed: Dec. 22, 1987

[51] Int. Cl.$^4$ .......................... G02F 1/01; H01S 3/10
[52] U.S. Cl. ....................................... 350/354; 372/22
[58] Field of Search ................ 350/354, 353; 372/21, 372/22

[56] References Cited

U.S. PATENT DOCUMENTS 4,019,159  4/1977  Hon et al. ..................... 372/22 X
4,739,507  4/1988  Byer et al. ..................... 372/22

OTHER PUBLICATIONS

Hung, A. H., "Generation of Tunable Picosecond VUV Radiation", *Applied Physics Letters*, vol. 25, No. 11, Dec. 1974, pp.653-654.

Jain et al., "Efficient Generation of Continuously Tunable Coherent Radiation in the 2460-2650Å Spectral Ranges", *IEEE Journal of Quantum Electronics*, pp. 555-556, 9/1976.

Jones et al., "Milliwatt-Level 213 nm Source Based on a Repetitively Q-Switched CW Pumped Nd:YAG Laser", *IEEE J of Quantum Elec.*, pp. 204-206, Apr. 1979.

Vanherzeele, "Thermal Lensing Measurment and Compensation in a Continuous-Wave Mode-Locked Nd:YLF Laser", *Optic Letters*, vol. 13, No. 5, May 1988, pp. 369-371.

*Primary Examiner*—Eugene R. Laroche
*Assistant Examiner*—Nathan W. McCutcheon
*Attorney, Agent, or Firm*—Paul Davis

[57] ABSTRACT

A KTP crystal in a nonlinear optical device is heated to and operated at a temperature of at least 50° C. and less than 350° C., and more preferably about 90° C. to about 200° C., and most preferably to about 100° C. to about 125° C., to reduce drift and damage. The KTP crystal is placed in an oven or other heating device, which may be regulated or unregulated. The KTP may be cut at the room temperature phase matching angle and angle tuned for operation at the higher temperature, or the KTP may be cut at the correct angle for phase matching at the operating temperature.

18 Claims, 2 Drawing Sheets

KTP CRYSTAL NONLINEAR OPTICAL DEVICE WITH REDUCED DRIFT AND DAMAGE

BACKGROUND OF THE INVENTION

The invention relates generally to nonlinear optical devices, and more particularly to nonlinear optical devices utilizing KTP crystals.

U.S. Pat. No. 3,949,323 to Bierlien and Gier describes the use of potassium titanyl phosphate, KtIOPO$_4$ (KTP) in nonlinear optical devices. U.S. Pat. Nos. 4,231,838 and 4,305,778 to Gier describe methods of making KTP.

One particular application for KTP as a nonlinear crystal is for optical second harmonic generation, as described in "KTP as a Harmonic Generator for Nd:YAG Lasers", R. F. Belt etal, Laser Focus, October 1985, pp. 110-124. To generate second harmonic, the condition of phase matching must be achieved. Generally, phase matching is of two types: type I wherein the two incident waves have the same polarization, and type II wherein the two incident waves have orthogonal polarization.

The indices of refraction of KTP are known to be essentially temperature independent over a relatively wide temperature range, e.g. as shown in "K$_x$Rb$_{l-x}$Ti-OPO$_4$: A new nonlinear optical material", F. C. Zumsteg etal, J. Appl. Phys., Vol. 47, No. 11, November 1976, pp. 4980-4985, particularly FIG. 6. As a result, the wavelength for phase matching is less sensitive to temperature change than other nonlinear optical materials, i.e. the thermal phase matching bandwidth is relatively large.

Conventionally, KTP crystals are used at room (ambient) temperature. The KTP crystal is cut at the proper angles and aligned for phase matching. Although the indices of refraction and the electro-optic coefficients are relatively constant as a function of temperature, there is no reason in the prior art to operate at higher than room temperature since no increase in conversion efficiency would result (in fact some temperature detuning would occur) and more apparatus would be required. For some crystals such as MfO:LiNbO$_3$ or BaNaNbO$_3$ in which phase matching at 1064 nm cannot be achieved at room temperature, it is necessary to operate at elevated temperatures just to produce phase matching. But this does not apply to KTP which is easily angle tuned to phase match at room temperature.

However, when KTP crystals are used for frequency doubling at high power, drift and damage problems occur. For example, in a 2 W frequency doubled modelocked system, or even a 1 W compressed pulse system, these effects may occur. Drift is the falloff of frequency doubled power with time. Beam distortion and damage to the crystal can also occur. It is desirable to reduce or eliminate the problems of drift and damage in a high power laser system using nonlinear KTP crystals for frequency doubling.

SUMMARY OF THE INVENTION

Accordingly it is an object of the invention to reduce drift or damage in KTP second harmonic generators.

It is also an object of the invention to provide method and apparatus for reducing drift and damage in a laser system using nonlinear KTP crystals.

The invention is a method and apparatus for heating a KTP crystal so the KTP crystal can be used as a frequency doubling nonlinear optical crystal with reduced drift and damage. The KTP crystal is heated to an operating temperature of at least about 50° C. and typically about 100°-125° C. at which drift and damage are significantly reduced or eliminated. A KTP crystal cut in the standard manner can be angle tuned at the operating temperature, or the KTP crystal can be cut in a modified manner so that it will be at the correct angle at the operating temperature. The KTP crystal can be heated with a simple heating means or oven. The heating can be unregulated or regulated. If necessary or desirable, a servo system can be used to maintain the operating temperature within a preselected range to prevent angle detuning.

DETAILED DESCRIPTION OF THE PREFERRED EMBODIMENTS

Figure 1:
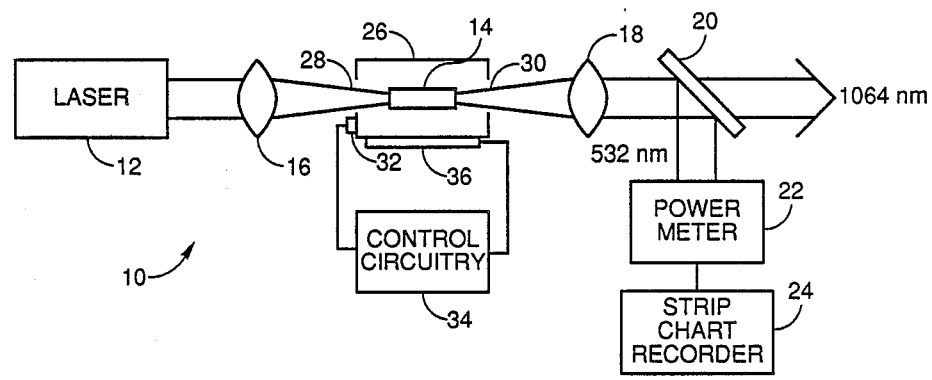
FIG. 1 is a schematic view of a laser system using a KTP crystal with means for heating the KTP crystal to reduce drift and damage.

As shown in FIG. 1, a nonlinear optical system 10 has a source laser 12 positioned to transmit laser radiation through a KTP frequency doubling crystal 14, e.g. using a means for directing the laser beam into the crystal such as lens 16. The laser 12 is typically a cw modelocked solid state laser, such as a Nd:YAG laser producing 10 W, 80 ps pulses at 1064 nm; however, Nd:YLF could be used in place of Nd:YAG, or any other suitable laser source could be used, e.g. any source around 1064 nm with pulsewidths in the range of about 50-100 ps. For the 10 W Nd:YAG laser source, a typical output from KTP crystal 14, obtained through lens 18, would be 8 W at 1064 nm and 2 W at 532 nm. The frequency doubled output of KTP crystal 14 may be separated by any suitable means such as dichroic beamsplitter 20, and the frequency doubled output measured by power meter 22 and recorded on any suitable recording means such as strip chart recorder 24.

In accordance with the invention, KTP crystal 14 is enclosed in or surrounded by heating means 26. Heating means 26 may be any conventional heating source, such as an oven, with an inlet port 28 and an outlet port 30 to allow transmission of optical radiation through the KTP crystal. Heating means 26 may be unregulated or regulated, as necessary or desired for the particular application. In a typical regulated (servo) system, a temperature transducer 32 is used to measure the temperature of the heating means (or crystal). Transducer 32 sends a temperature signal to control circuitry 34 which sends an actuation signal to heating elements 36 of heating means 26. Thus, a simple servo system can be used to maintain the crystal temperature within a preselected range.

The preferred temperature range according to the invention for operating the KTP crystal is at least about 50° C. (122° F.). A typical operating temperature is in the range of about 100° C. to about 125° C., e.g. 115° C. (239° F.) since these temperatures are easily produced with conventional ovens. A more general range is about 90° C. to about 200° C. The upper limit would be the melting temperature of the crystal, 1000° C.; a more practical limit is the temperature at which the coatings (antireflection optical coatings) usually found on the crystal are damaged, about 350° C. Using a servo system the temperature can be regulated to the desired degree, e.g. ±2° C.

Figure 2:
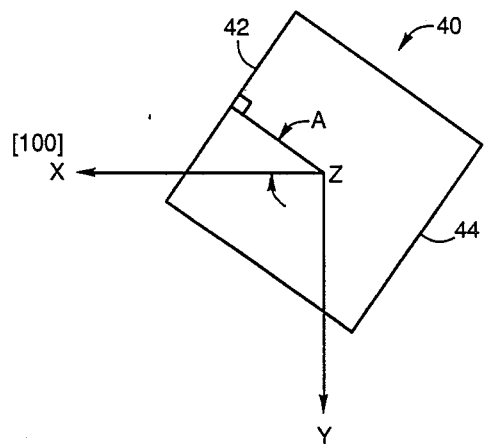
FIG. 2 shows the orientation of a KTP parallelopiped in relation to the crystallographic axes, with the phase matching angle A which depends on temperature.

To achieve phase matching, in accordance with the invention, a crystal cut at the appropriate angles, as shown in FIG. 2, is used. A parallelopiped 40 of KTP, typically 3 mm×3 mm×5 mm, is cut as shown relative to the crystallographic axes x, y, z with the x axis corresponding to the crystal [100]. The fundamental beam propagates in a direction in the x-y plane and is incident onto entrance face 42; opposed exit face 44 may also be used as the entrance face, i.e. the beam may be propagated in either direction. The phase matching angle A defined between the normal to the entrance face 42 and the x axis is a function of temperature. For room temperature, A is about 27° while for an operating temperature of 115° C. A is about 32°. When the KTP is cut at a phase matching angle A(T) for a particular temperature, then at that temperature the entrance face will be normal to the beam. As the operating temperature is changed, some angle tuning is required. Thus, to use a crystal cut at the standard room temperature phase matching angle (A=27°) the crystal is mounted in an oven and properly aligned with the laser beam for room temperature operation (i.e. entrance face normal to laser beam. The KTP is then heated to the desired operating temperature which requires adjsutment of the phase matching angle by angle tuning. The crystal entrance face is tilted away from the beam normal until the optimum phase matching angle for that particular operating temperature is reached. To perform the angle tuning, the KTP can be mounted in a fixed orientation in the oven and the entire oven tilted, or the KTP crystal may be movably mounted in the oven so the crystal itself can be tilted; any method of changing the angle of the crystal to the laser beam may be used. Alternatively, the KTP may be cut at the correct angle for the higher operating temperature phase matching. The KTP is then mounted in an oven and proeprly aligned with the laser beam for room temperature operation (the entrance face will not be normal to the beam since the crystal has not been cut for room temperature phase matching). The KTP is then heated to the preselected operating temperature (for which the crystal was cut) and the angle adjusted so that the crystal is at the right phase matching angle for this temperature (the entrance face will now be normal to the beam).

Figure 3A:
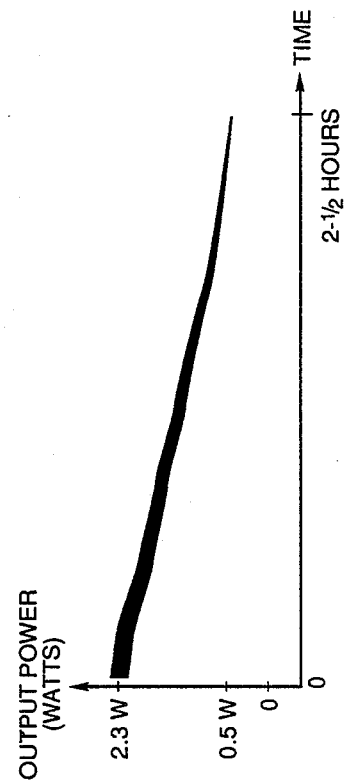
FIGS. 3A and B are plots of the output power of a KTP crystal as a function of time for KTP at room temperature and at a drift and damage reducing operating temperature of 115° C., respectively
Figure 3B:
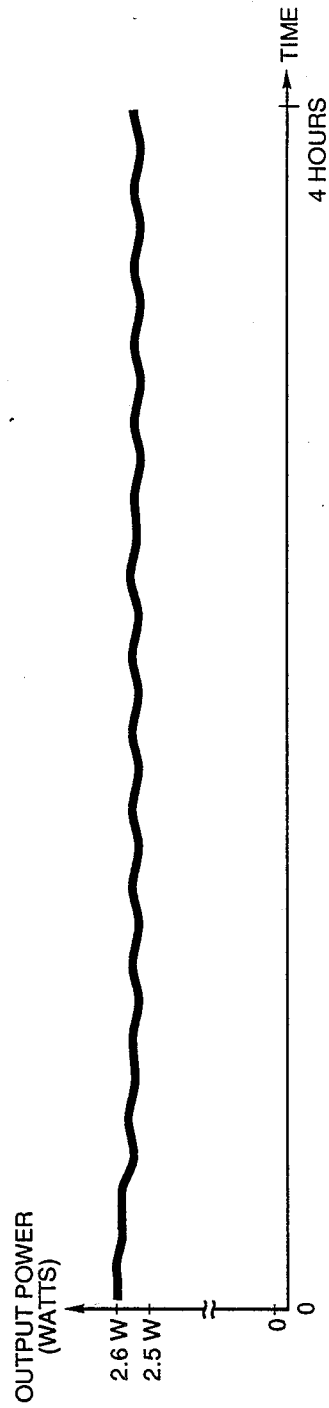

FIGS. 3 A and B show the improvement in drift achieved by the invention. FIG. 3A shows room temperature drift of a KTP crystal; the initial output of 2.3 W (green) drops to 0.5 W after 2½ hours. FIG. 3B shows the same crystal heated to 115° C. in accordance with the invention; the initial output of 2.6 W has only dropped to 2.35 W after 4 hours.

EXAMPLE I

1. A 3 mm×3 mm×5 mm KTP crystal cut for room temperature phase matching (A=27°) was placed in an oven and was properly aligned with a laser beam for room temperature operation (normal to beam).
2. The temperature of the KTP (oven) was elevated to 115° C.
3. The phase matching angle was readjusted for phase matching at 115° C. by tilting the oven (away from beam normal).

EXAMPLE II

1. A crystal as in Example I, step 1, is placed in an oven and aligned for room temperature operation.
2. The KTP is heated to 50° C.
3. The phase matching angle is readjusted for phase matching at 50° C. by tilting the oven.

EXAMPLES III-VII

1. Same as Example II, step 1.
2. The KTP is heated to 90° C., 100° C., 125° C., 200° C., 350° C., respectively.
3. The phase matching angle is readjusted for phase matching at 90° C., 100° C., 125° C., 200° C., 350° C., respectively, by tilting the oven.

EXAMPLE VIII-XIV

1. A 3 mm×3 mm×5 mm KTP crystal cut for phase matching at 50° C., 90° C., 100° C., 115° C., 200° C., 350° C., respectively, is placed in an oven and properly aligned with a laser beam for room temperature operation (not normal to beam).
2. The KTP is heated to 50° C., 90° C., 100° C., 115° C., 125° C., 200° C., 350° C., respectively.
3. The phase matching angle is adjusted for phase matching at 50° C., 90° C., 100° C., 115° C., 125° C., 200° C., 350° C., respectively (the angle for which the crystal was cut), by tilting the oven (so the crystal is normal to the beam).

Changes and modifications in the specifically described embodiments can be carried out without departing from the scope of the invention which is intended to be limited only by the scope of the appended claims.

I claim:

1. In a nonlinear optical device comprising means to direct at least one incident beam of electromagnetic radiation into a crystal having nonlinear optical properties whereby electromagnetic radiation emerging from said crystal contains at least one frequency different from the frequency of any incident beam of radiation, wherein the improvement comprises a KTP crystal heated to a drift reducing operating temperature at which a reduction of a falloff of output power as a function of time from said KTP crystal is achieved.

2. The device of claim 1 wherein the KTP crystal is heated to a temperature of at least about 50° C.

3. The device of claim 1 wherein the KTP crystal is heated to a temperature of about 100° C. to about 125° C.

4. The device of claim 1 wherein the KTP crystal is heated to a temperature of about 90° C. to about 200° C.

5. The device of claim 1 wherein the KTP crystal is heated to a temperature below about 350° C.

6. The device of claim 1 wherein the KTP crystal is cut to phase match at room temperature and is angle tuned at the operating temperature.

7. The device of claim 1 wherein the KTP crystal is cut to phase match at the operating temperature.

8. The device of claim 1 further including heating means operatively connected to the KTP crystal.

9. The device of claim 8 wherein the heating means are unregulated.

10. The device of claim 8 wherein the heating means are regulated.

11. The device of claim 8 wherein the heating means includes servo means for maintaining the operating temperature within a preselected range.

12. A method of reducing drift in a nonlinear optical device comprising means to direct at least one incident beam of electromagnetic radiation into a KTP crystal having nonlinear optical properties whereby electromagnetic radiation emerging from said crystal contains at least one frequency different from the frequency of any incident beam of radiation, the method comprising heating said KTP crystal to a drift reducing operating temperature at which a reduction in falloff of output power as a function of time from said KTP crystal is achieved.

13. The method of claim 12 comprising heating to at least about 50° C.

14. The method of claim 12 comprising heating to a temperature of about 100° C. to about 125° C.

15. The method of claim 12 comprising heating to a temperature of about 90° C. to about 200° C.

16. The method of claim 12 comprising heating to a temperature of lass than about 350° C.

17. The method of claim 12 further comprising cutting the KTP crystal to phase match at normal temperature and angle tuning the KTP crystal at the operating temperature.

18. The method of claim 12 further comprising cutting the KTP crystal to phase match at the operating temperature.

* * * * *